United States Patent [19]
Laskowski et al.

[11] Patent Number: 6,065,274
[45] Date of Patent: May 23, 2000

[54] ARTICULATING LAWN MOWERS

[75] Inventors: Jeffrey J. Laskowski, Lizton; Thomas M. Rich, Brownsburg, both of Ind.

[73] Assignee: LasTec, Inc., Lizton, Ind.

[21] Appl. No.: 08/681,671

[22] Filed: Jul. 29, 1996

Related U.S. Application Data

[60] Provisional application No. 60/013,182, Mar. 12, 1996.

[51] Int. Cl.[7] .................................................. A01D 69/08
[52] U.S. Cl. ................................... 56/11.6; 56/13.5; 56/6; 56/DIG. 10; 56/DIG. 22
[58] Field of Search ...................................... 56/11.6, 11.7, 56/13.5, 13.6, 17.5, 17.1, 320.1, DIG. 10, DIG. 22, 6

[56] References Cited

U.S. PATENT DOCUMENTS

| | | | |
|---|---|---|---|
| 2,952,961 | 9/1960 | Engler | 56/25.4 |
| 3,116,583 | 1/1964 | Mason | 56/6 |
| 3,339,353 | 9/1967 | Schreyer | 56/6 |
| 3,590,564 | 7/1971 | Clifford . | |
| 3,680,292 | 8/1972 | McCanse . | |
| 3,709,215 | 1/1973 | Draege . | |
| 4,068,452 | 1/1978 | Schaefer et al. | 56/6 |
| 4,192,525 | 3/1980 | Clark | 280/443 |
| 4,231,215 | 11/1980 | Klas . | |
| 4,395,865 | 8/1983 | Davis, Jr. et al. | 56/13.3 |
| 4,429,515 | 2/1984 | Davis, Jr. et al. | 56/6 |
| 4,497,160 | 2/1985 | Mullet et al. | 56/6 |
| 4,813,215 | 3/1989 | Chase et al. . | |
| 4,858,417 | 8/1989 | Priefert et al. | 56/6 |
| 4,901,507 | 2/1990 | Cracraft | 56/6 |
| 5,004,251 | 4/1991 | Velke et al. | 280/32.7 |
| 5,012,632 | 5/1991 | Kuhn et al. . | |
| 5,079,926 | 1/1992 | Nicol | 56/12.7 |
| 5,109,655 | 5/1992 | Tekulve | 56/6 |
| 5,177,942 | 1/1993 | Hager et al. | 56/11.6 |
| 5,209,049 | 5/1993 | Heard | 56/15.5 |
| 5,233,817 | 8/1993 | Nicol | 56/6 |
| 5,241,808 | 9/1993 | Colistro | 56/6 |
| 5,249,411 | 10/1993 | Hake | 56/11.6 |
| 5,321,938 | 6/1994 | LeBlanc | 56/6 |
| 5,343,683 | 9/1994 | Friesen | 56/6 |
| 5,361,566 | 11/1994 | Hohnl . | |
| 5,367,863 | 11/1994 | Quataert | 56/13.5 |
| 5,463,853 | 11/1995 | Santoli et al. | 56/6 |
| 5,483,787 | 1/1996 | Berrios | 56/10.1 |
| 5,526,635 | 6/1996 | Wilder, Jr. . | |
| 5,771,669 | 6/1998 | Langworthy et al. . | |

*Primary Examiner*—H. Shackelford
*Attorney, Agent, or Firm*—Woodard, Emhardt, Naughton, Moriarty & McNett

[57] ABSTRACT

A mowing apparatus with multiple articulating cutting decks includes a pair of side cutting decks attached to a center cutting deck. The side decks are pivotally attached to the center deck and pivot about axes which lie in the planes defined by rotation of the respective cutting blades. The cutting blades are driven by pulleys and belts. Proper tension in each side drive belt is maintained during pivoting of the corresponding side deck by an assembly comprising a pair of idler pulleys rotatably mounted on a pivotally attached pulley arm which is biased in the direction which increases tension on the belt.

40 Claims, 5 Drawing Sheets

6,065,274

ARTICULATING LAWN MOWERS

This application claims the benefit of U.S. Provisional Application Ser. No. 60/013,182, filed Mar. 12, 1996.

FIELD OF THE INVENTION

The present invention relates to improvements in the field of lawn mowers with multiple articulating cutting blades.

DESCRIPTION OF THE PRIOR ART

In many applications it is desirable to have a mower which can cut a relatively wide path of grass in order to handle larger lawns and fields. The cost and time of mowing can be substantially reduced by using a mower with a wide cutting path. However, the wider the cutting path is, the more likely it is that a particular path of the mower will encounter irregularities in the terrain. The cutting blades of the mower must be able to articulate over these irregularities, or they will scalp the high areas and miss grass in the low areas.

The articulation of multiple cutting blades poses several issues for a mowing apparatus. The relative movement of the blades should be controlled to provide an even cutting of the grass. At the same time, the manner of articulation requires means for providing movement of the blades while also powering the blades in the cutting action. There are numerous proposals for solutions to problems associated with this articulation, including what kind of articulation to permit, how to implement that articulation, and how to maintain delivery of power to the cutting blade during articulation.

U.S. Pat. No. 5,463,853 shows a mower in which there are two center cutting blades contained in a housing that is fixed relative to the vehicle. Side decks are attached to either side of the fixed center housing by a hinge and a pivot. One side of the hinge is connected to the top of the center housing. The other side of the hinge contains a pivot. The pivot attaches to the housing of the side deck. The side deck can rotate about the pivot, and the pivot can rotate about the hinge axis. Power is delivered to the side decks by a drive belt whose path engages a single idler pulley.

U.S. Pat. No. 5,079,926 depicts a mower in which the center deck is attached by a link to the vehicle with both ends of the link allowing rotation. This allows the center deck to both pitch and vertically translate. Side decks compatible with that design are shown in U.S. Pat. No. 5,233,817, granted to the same inventor. These side decks can pitch about pivots attached relatively high on the center housing. Tension in the drive belt to the side deck is maintained during rotation by a rectangular aperture guideway through which the belt passes.

U.S. Pat. No. 4,395,865 shows a center deck with three blades that is raised and lowered by a hydraulic cylinder. U.S. Pat. No. 4,429,515 awarded to the same inventors shows side decks that may be attached to the center deck by means of links. These links attach to the center deck high on its housing, and attach to the side decks low on their housings. These links permit pivoting of the side units relative the center deck. Belt tension is maintained during pivoting by a single idler pulley connected to a spring-loaded arm. The arm also incorporates a brake.

U.S. Pat. No. 5,177,942 shows a mower in which the center deck is raised and lowered by a hydraulic cylinder through a pair of arms attached to the center deck with ball joints. Side cutting decks are attached to the center deck by links. These links attach by one pivot high on the center deck housing, and by another pivot low on the side deck housing, permitting rolling motion of the side decks. Belt tension during rolling of a side deck is maintained by arranging the belt to be almost parallel to the axes of the pivots. This arrangement results in twisting of the belt rather than bending of the belt.

SUMMARY OF THE INVENTION

The present invention provides an improved method and apparatus for use in a mowing apparatus having multiple, articulating cutting blades. The blades are mounted to at least first and second decks. The first deck is directly attached to the second deck to permit the first deck to pivot relative thereto. The axis of pivoting is preferably located at the plane of the cutting blades.

One aspect of this invention concerns the manner in which tension is maintained in the drive belts which provide power to the cutting blades. Proper tension is maintained during articulation of a cutting deck by a belt tensioning device comprising a pair of idler pulleys rotatably mounted on a spring loaded pulley arm, which itself is pivotally attached to the mower. Tension in the spring biases the pulley arm to rotate in a direction which causes excess belt slack to be taken up as increased wrap around the idler pulleys.

It is an object of the present invention to provide an apparatus for mowing which includes articulating cutting blades mounted in a manner which provides desirable cutting over various terrains.

A further object of the present invention is to provide a means for maintaining power to the cutting blades when they articulate in response to irregularities in the terrain.

These and other features and advantages will be apparent from the following description of the preferred embodiment of the invention.

DESCRIPTION OF THE PREFERRED EMBODIMENT

Figure 1:
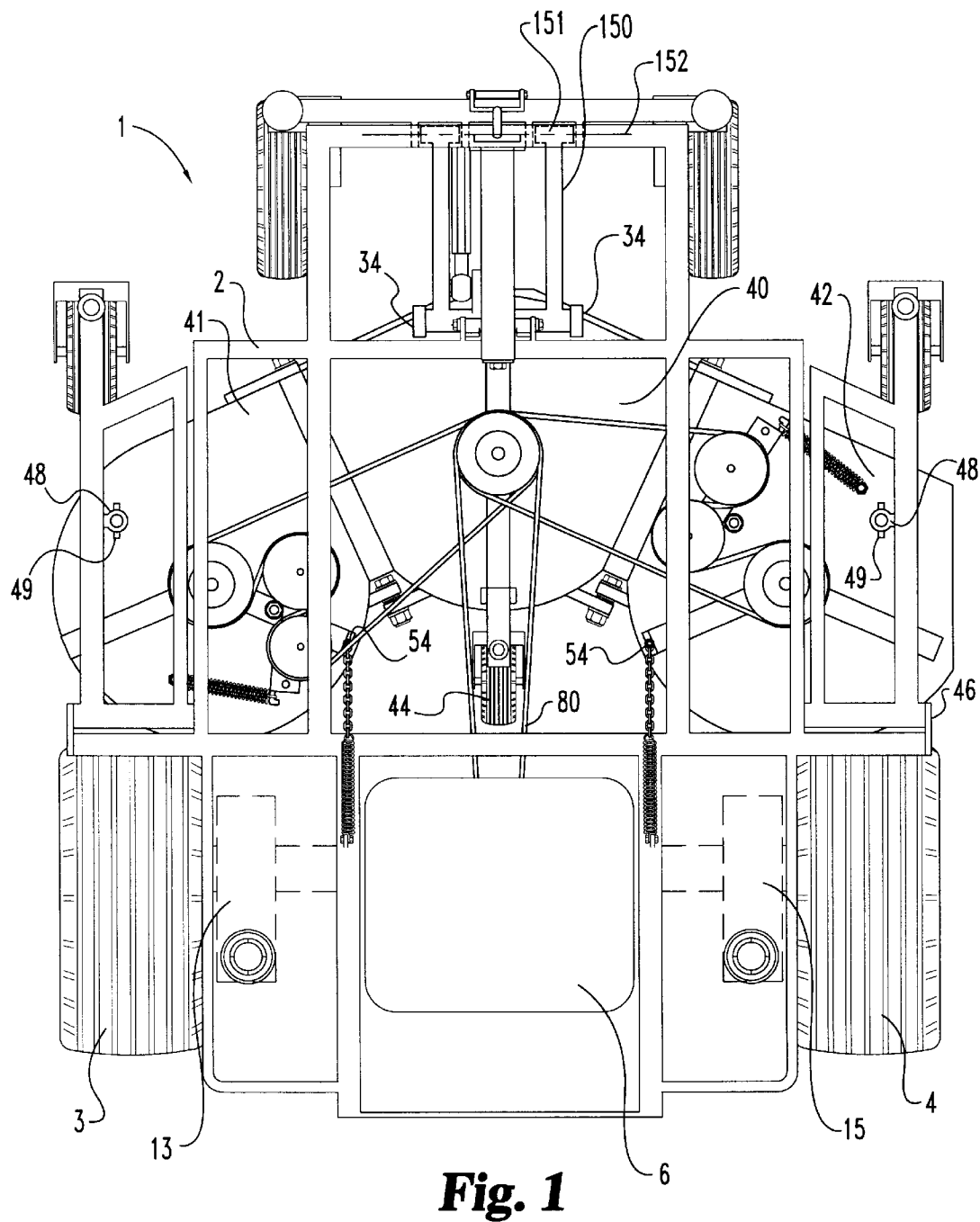
FIG. 1 is a top, plan view of portions of a mowing vehicle incorporating the preferred embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

The present invention is related to a mowing apparatus which includes multiple, articulating cutting decks supporting cutting blades that smoothly and accurately follow the contour of the terrain being cut. As used herein, the term cutting deck refers generally to the mounting structure to which the cutting blades are rotatably attached. Thus, reference to the articulation of the cutting decks is similarly a reference to the articulation of the supported cutting blades. The preferred embodiment is shown in respect to three cutting decks, one in the center and one on either side. However, it will be appreciated that the principles of the present invention apply equally well to any assembly of two or more cutting decks secured together for articulation.

The present invention is also useful with any apparatus that is used for mowing. In the preferred embodiment, the articulating cutting blades are shown as being incorporated into a self-contained vehicle that would also include an engine, wheels, controls, etc. The invention could alternatively form a part of an assembly that is attached to a separate vehicle which pushes or pulls the mowing apparatus.

Articulation of the cutting decks and blades requires that the decks be mounted to permit relative movement in two respects. First, the decks are mounted directly or indirectly to a supporting framework and are permitted to move relative thereto. Second, a given deck is attached to at least one adjacent deck in a manner to permit one deck to pivot or otherwise move relative to the other deck. In a preferred embodiment and for purposes of description herein, there is provided an assembly of three decks, namely a center deck and two side decks.

To provide the desired positioning of a deck relative the ground, the decks each ride at least partially on wheels which roll over the ground. Preferably each deck is permitted to be supported relative the ground by three support points. For example, a side deck is pivotally hinged to the center deck at two coaxial locations. The side deck is also supported along the ground at one point near its outer edge. The two hinge locations plus the outer support constitute three point support for the side deck. Since the three points define a plane, the deck is properly supported on the ground and is free to closely follow the contour of the ground over which it moves. Inclusion of a fourth support point could be used, but is not required.

Similarly, the center deck and supported cutting blade are positioned for three point support relative the ground. The front of the center deck is supported for pivoting along a horizontal hinge line, and the rear of the deck is supported at a single point by a wheel. The two points required to establish the hinge line and the single point of rear support constitute three point support for the center deck.

The cutting blades are driven by drive belts and pulleys. One belt provides power from the engine to the center deck. When three decks are included, a separate belt provides power from the center deck to each of the side decks. As the center deck articulates relative to the engine, and the side decks articulate relative to the center deck, the distance between belt pulleys changes. The present invention provides a method and apparatus for maintaining proper tension in the belts by changing the effective distance over which the belts must travel between the pulleys. In particular, this is accomplished by routing each belt around a pair of idler pulleys that are rotatably attached to a pulley arm. The pulley arm is attached pivotally to the mower, and thereby the length of drive belt in engagement with the idlers is changed as required.

In the preferred embodiment, the belt is wrapped in an "S" shape around the idlers. As the drive pulleys move apart during articulation, the "S" shape unwinds as the idler pulleys rotate in one direction about the pivot point of the pulley arm. As the drive pulleys move closer together, the "S" shape winds further as the idler pulleys rotate in the other direction about the pivot point of the pulley arm.

The pulley arm is biased in a direction which increases tension on the associated drive belt. The pivot arm may be biased in this manner in various ways well known in the art, and the apparatus used for this purpose is not limiting on the present invention. In the preferred embodiment, for example, biasing is accomplished by attaching a spring at one end to the pulley arm, and at the other end to one of the cutting decks. The spring pulls on the pulley arm in the direction of increasing belt tension. In an alternate embodiment, tensioning is accomplished with a telescoping arm. One end of the arm is attached to the pulley arm and the other end is attached to one of the cutting decks. A compression spring pushes the telescoping arm in the direction of increasing belt tension. Various other means for biasing the pulley arm in the required direction are encompassed by the present invention.

Referring in particular to the drawings, there is shown in FIG. 1 a mowing vehicle including a main frame 2 which extends side to side and front to rear of the vehicle and forms a means of support for many of the components of the vehicle. Vehicle 1 includes driving wheels 3 and 4, which receive power from hydraulic drive units 13 and 15, respectively. These hydraulic drive units, as well as the cutting blade drive system to be described later, are powered by engine 6, which is supported by main frame 2. For purposes of clarity and since they form no part of the present invention, the seat, various covers, and control components are not shown in FIG. 1.

Attached on either side of center deck 40 are side decks 41 and 42. Attachment of side deck 42 to center deck 40 and vertical support of side deck 42 will be described in detail. The attachment and support scheme of side deck 41 to center deck 40 is a mirror image of that for side deck 42 and therefore is not separately described.

The outer edge of right side deck 42 is supported vertically at attachment 49. In the preferred embodiment, attachment 49 is connected to the structure of vehicle 1 by a chain (not shown). However, a cable, rod, or any other means for support could be used that does not horizontally constrain side deck 42 as it rotates about its attachment to center deck 40.

Side deck 42 also incorporates stiffeners 56 and 58 (FIG. 2) to reduce bending of the side deck. Stiffener 56 also incorporates attachment 54. Attachment 54 can be used to attach a spring between the deck and the frame for load transfer to main frame 2. This load transfer helps reduce the vertical load of center deck rear wheel 44, and thus reduce damage to the grass from the footprint of the wheel.

Figure 3:
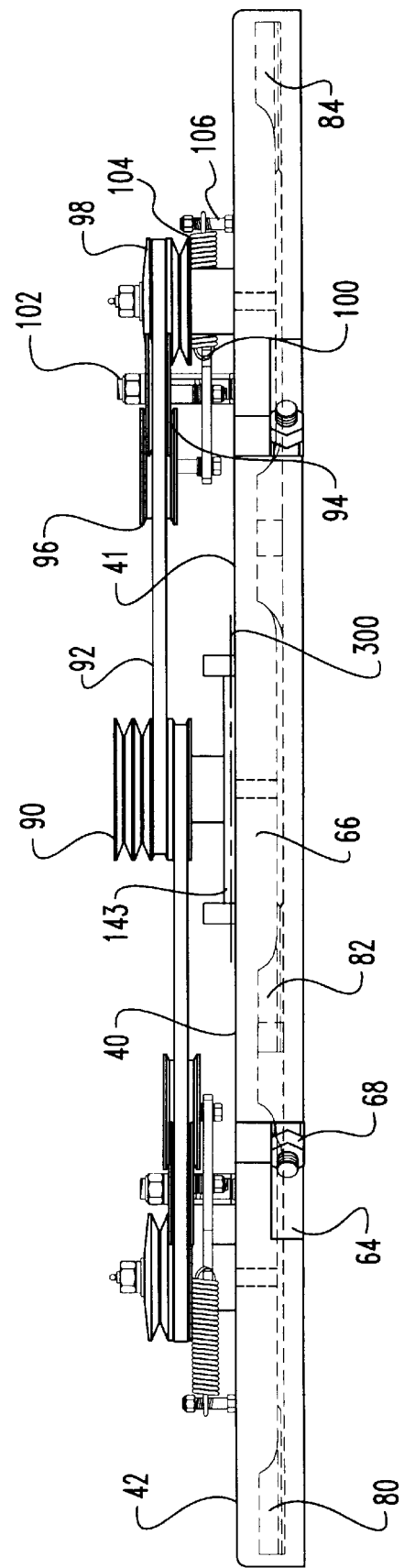
FIG. 3 is a front, elevational view of the cutting decks shown in FIG. 2.

Center deck support 143 mounts the center deck 40 to the frame 2. The support 143 includes a pair of forwardly extending arms 150 which terminate in sleeves 151 received upon shafts mounted to the frame 2, thereby providing for pivoting of the center deck support about the horizontal rotational axis 152. The center deck is further supported by pivotal attachments 34 of center deck support 143 (FIG. 3). These pivotal attachments define rotational axis 300 for center deck 40. Center deck 40 is supported vertically at the rear by wheel 44.

Figure 2:
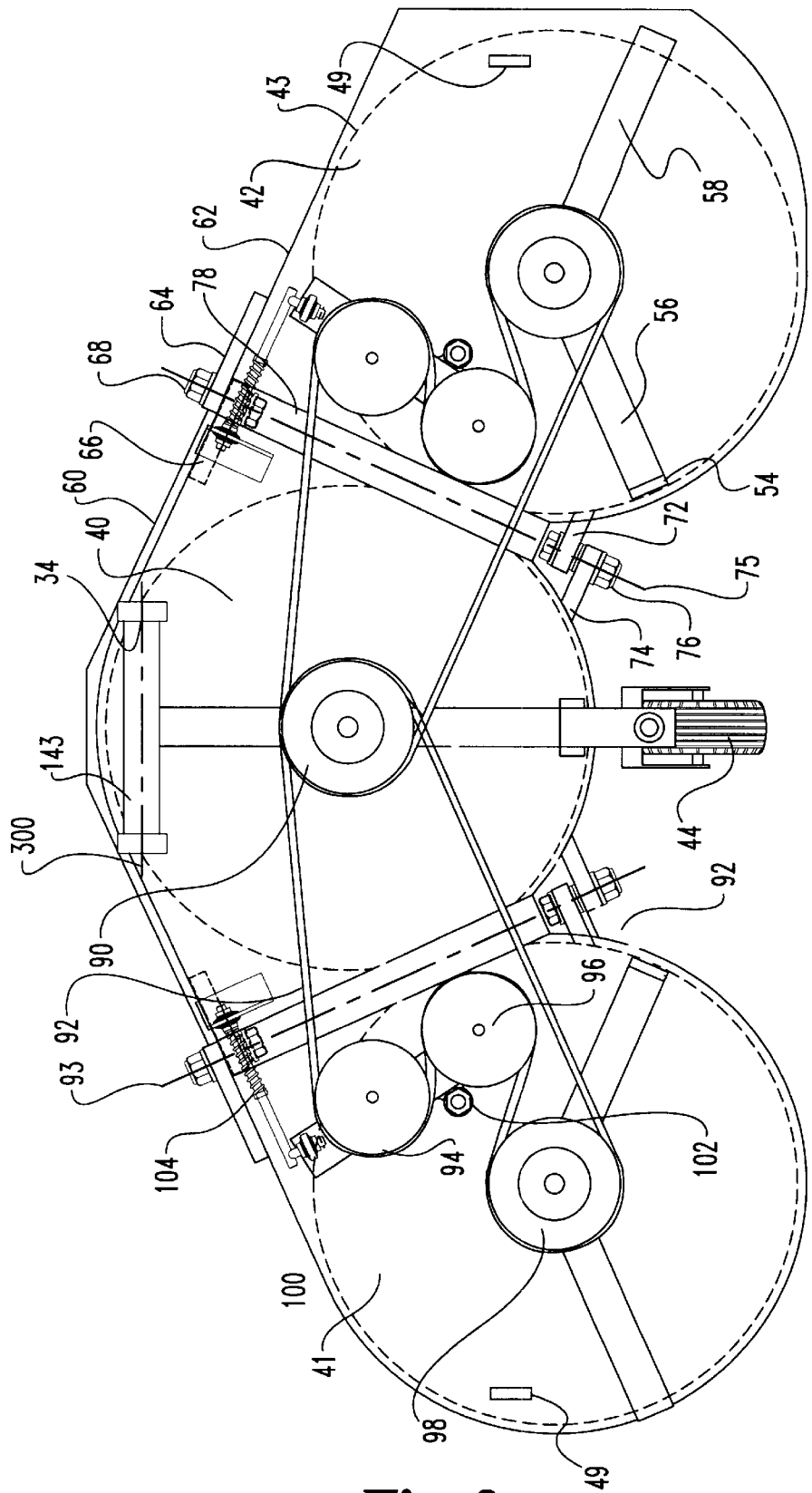
FIG. 2 is a top, plan view of cutting decks useful with the present invention.

In FIG. 2 there are shown the three cutting decks of the preferred embodiment, and in particular the pivoting attachment of the side decks to the center deck. Front side hinge plate 64 is attached rigidly to side housing 62 of side deck 42. Front center hinge plate 66 is attached to the inside of center housing 60 of center deck 40, as shown by the dashed lines in FIG. 2. Hinge plates 64 and 66 are rotatably connected by pivot 68. Side deck 42 is also rotatably attached to center deck 40 at the rear of both decks. Rear side hinge plate 72 is attached to side housing 62, and rear center hinge plate 74 is attached to center housing 60. Hinge plates 74 and 72 are rotatably coupled by pivot 76. Pivots 68 and 76 create an axis of rotation 75 of the side deck 42 relative center deck 40. Cover plate 78 covers the area between center housing 60 and side housing 62 that would otherwise be exposed during deck articulation.

It is a feature of the present invention that articulation of the cutting blades is accomplished without adversely affecting the cut accomplished by the blades. The cutting circle defined by rotation of the cutting blades is shown, for example, at 43. It will be apparent that the blades are positioned so that there is significant overlap of cutting as the mower is moved forward. There is also sufficient overlap of cutting to avoid gaps in the cutting when the mower is turned in either direction.

In addition, the present invention provides for articulation of the cutting blades which optimizes the cutting profile even for uneven terrain. In particular, as shown in FIG. 3, the pivoting axis 75, for movement of the side deck relative the center deck, is located vertically in the plane of cutting by the blades 80 and 82. This is a significant variance from the prior art and provides a distinct advantage when the decks articulate.

In the past, connections between associated cutting decks have provided for relative movement at locations outside of the cutting plane. This has apparently been done to facilitate the driving connections for the blades. That is, pivoting of the associated decks at the level of the attachments of the drive belts to the pulleys helps to minimize the problems in driving the blades when the decks articulate because the travel distances for the belts does not then change signficantly with articulation. However, as a result of this past approach, articulation of the blades can cause one of two problems. In one instance, the adjacent blade edges will move closer together and could actually come into contact, resulting in severe damage and potential hazard. In the other instance, the blades can move apart a sufficient distance that the desired overlap in cutting paths is lost, and areas of grass are left uncut between the adjacent blades.

The present invention protects against these occurrences. The pivoting of the connected decks at the blade level only avoids the possibility of the blades moving to or from each other. The present invention incorporates this unique advantage, and is able to do so by the novel method of driving the blades described hereafter.

In FIGS. 2 and 3 there is shown the manner in which the side cutting blades of the present invention are driven. In the preferred embodiment, center drive pulley 90 is driven by drive belt 80 (FIG. 1), which in turn receives power from a pulley mounted to the drive shaft of engine 6. However, it is also possible for power to be transmitted to pulley 90 in another manner. For example, power could be provided to pulley 90 hydraulically, by a gear linkage, or in other ways. The manner of driving the center pulley does not impact on the mode of operation of the advantageous side pulley drive of the present invention.

Center pulley 90 is coupled with and drives side drive pulley 98 by means of side drive belt 92. Side drive belt 92 engages idler pulleys 94 and 96, and also side drive pulley 98. Side drive pulley 98 is attached rotatably to a shaft that drives cutting blade 84, as shown in FIG. 3.

As side deck 41 rotates about axis 93, the distance from side drive pulley 98 to center drive pulley 90 changes. Since drive belt 92 is of a constant length, the drive path of belt 92 must change to accommodate the change in distance between drive pulleys. The change in distance between drive pulleys 98 and 90 is accommodated by a complementary change in the length of drive belt that engages idler pulleys 94 and 96.

The idler pulleys 94 and 96 are rotatably mounted onto pulley arm 100. Pulley arm 100 is attached to side deck 41 by pivot 102 and is thereby rotatable about a vertical axis extending generally normal to the plane of the drive belt. Pivot 102 is preferably located between the rotational axes of pulleys 94 and 96. Tension spring 104 connects to pulley arm 100 at attachment 105, and to deck 41 at attachment 106. Spring 104 applies a force on pulley arm 100 to bias the arm in the direction to increase tension on the belt, i.e., to rotate the pulley arm in the clockwise direction in FIG. 2.

When side deck 41 articulates relative to center deck 40 in the upward direction, the distance from side drive pulley 98 to center drive pulley 90 will decrease since the decks pivot relative one another at a location below the drive belt. In this instance, spring 104 will rotate pulley arm 100 clockwise about pivot point 102. Since pivot 102 is located between pulleys 94 and 96, clockwise rotation of pulley arm 100 results in an increase in the length of drive belt 92 that wraps around the idler pulleys. The result is that the slack which would otherwise occur in the belt is taken up by the idler pulleys.

Conversely, if the the side deck pivots in a downward direction relative the center deck, the distance between side drive pulley 98 and center drive pulley 90 increases. In this instance, pulley arm 100 will rotate against the force of the spring 104 in the counter-clockwise direction. This will reduce the travel distance for the drive belt between the pulleys 90 and 98. In other words, the length of side drive belt 92 that engages idler pulleys 94 and 96 will be reduced. At the same time, the continuing spring force applied to the pulley arm 100 will maintain the desired tension on the side drive belt.

Side drive belt 92 engages idler pulleys 94 and 96 in an "S" shape. As seen in FIG. 2, side drive belt 92 wraps around one side of idler pulley 94, and then crosses over and wraps around the other side of idler pulley 96. Because of this crossover between the idler pulleys 94 and 96, movement of side drive belt 92 will cause the idler pulleys to rotate in opposite directions. The belt crossover and opposite rotation of the idler pulleys shown as the preferred embodiment is not required, however. For example, it is also possible to move the assembly of pivot, pulley arm, pulleys, and spring outboard of drive pulley 98. Then, by also moving pivot 102 to the opposite side of idler pulley 94, belt tension would also be maintained during pivoting of the side deck.

The idler pulleys and pulley arm assembly is shown mounted to the side deck in the preferred embodiment. However, it is clear that the assembly could alternatively be mounted on the center deck. In a mower with only two decks, the present invention could be attached to either deck. More generally, the pulley arm assembly could be mounted to either the driving or driven deck, or even to the mower at a location separate from the decks.

Although the preferred embodiment is shown using tension spring 104, it would also be possible to accomplish the biasing of pulley arm 100 with other conventional means. Alternate means include, for example, a compression spring or a torsional spring, in a manner known to those of ordinary skill in the art.

Figure 4:
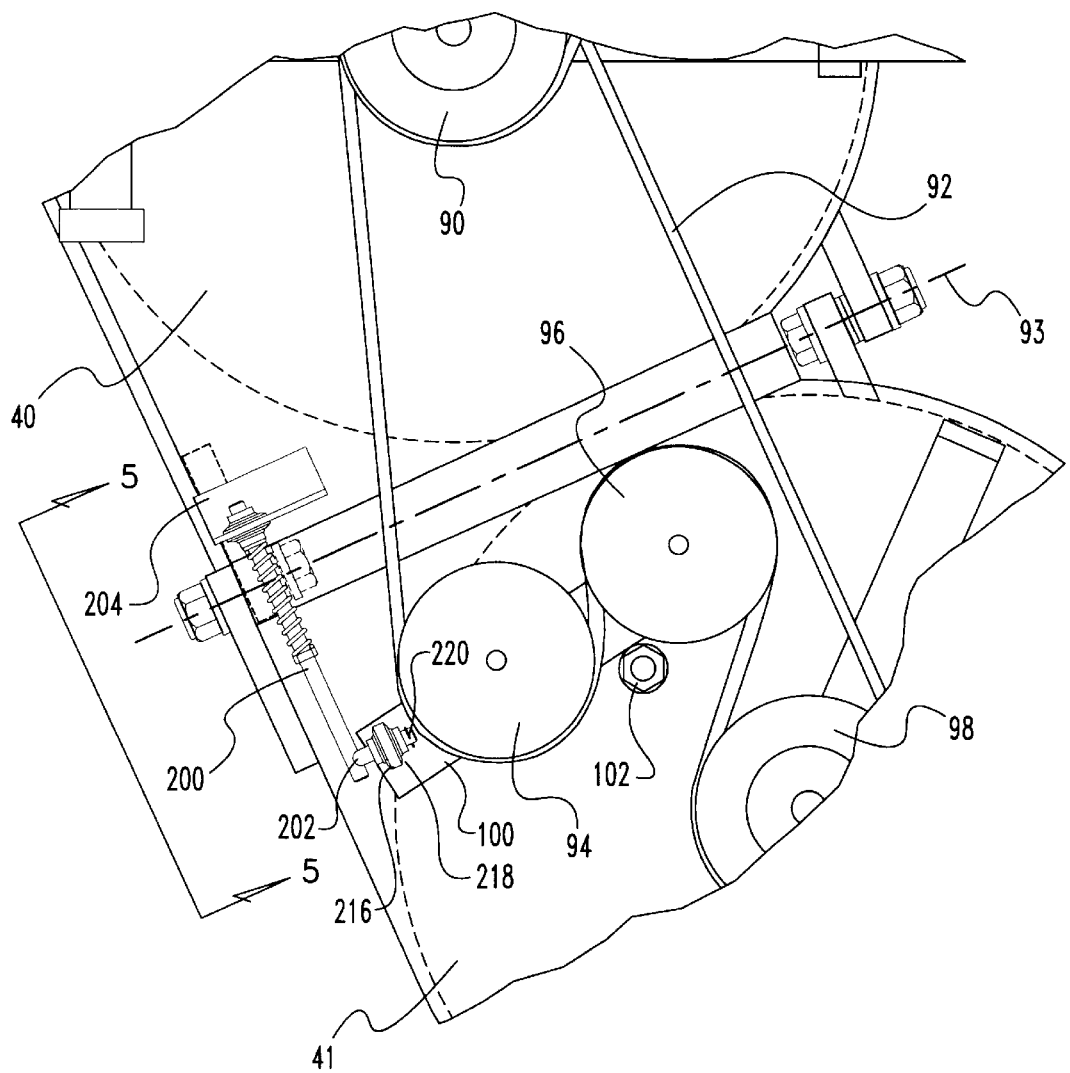
FIG. 4 is a top, plan view of an alternate embodiment of the present invention.
Figure 5:
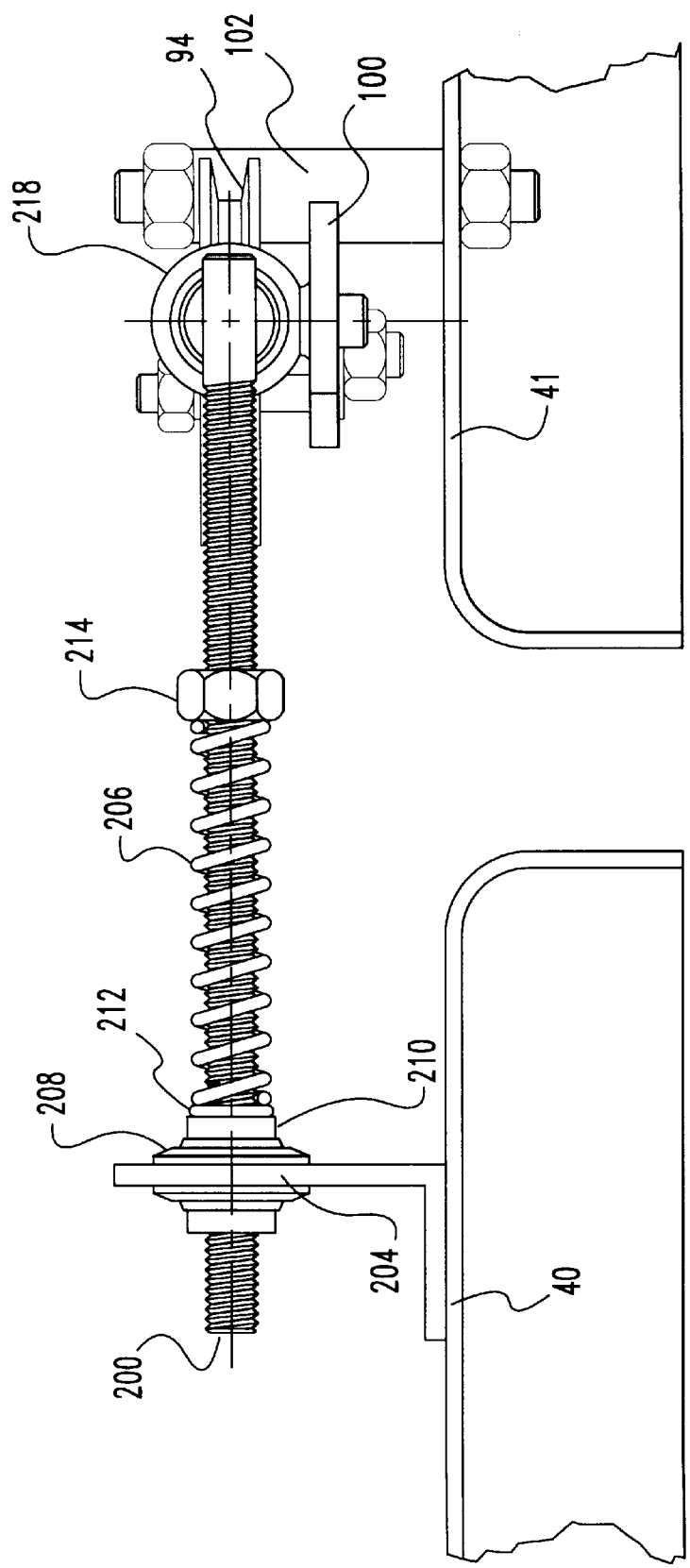
FIG. 5 is a partial, elevational view taken along line 5—5 in FIG. 4 and looking in the direction of the arrows.

By way of further example, FIG. 4 shows an alternate embodiment of the present invention for providing tensioning of side drive belt 92. As in the preferred embodiment, side drive belt 92 wraps around idler pulleys 94 and 96 in an "S" shape. Also similar to the preferred embodiment, idler pulleys 94 and 96 are rotatably attached to pulley arm 100, which is pivotally attached at 102 to side deck 41.

In the alternate embodiment, however, spring loading to pulley arm 100 is provided by compression spring 206 acting along spring guide 200. Note that spring guide 200 crosses rotational axis 93. Spring guide 200 is able to pass slidably through pivotal member 210. Pivotal member 210 is part of a ball joint assembly 208, the outer member of which is attached to bracket 204, which is fixed to center deck 40. Assembled onto spring guide 200 are washer 212, compression spring 206, and adjustable spring stop 214. Welded to the other end of spring guide 200 is L-pin 202. This pin fits slidably through pivotal member 216, which is part of ball joint assembly 218. The outer member of ball joint 218 is fixed to pulley arm 100. The end of L-pin 202 protrudes through pivotable member 216, where it is held by cotter pin 220.

When cutting decks 40 and 41 articulate such that the distance from center drive pulley 90 to side drive pulley 98 decreases, then there will also be a decrease in the distance between the outer member of ball joint 218 and the outer member of ball joint 208. This will also shorten the distance from adjustable spring guide 214 to spring stop 212, increasing the compression forces of compression spring 206. This increase in compression force will react against adjustable spring stop 214, and cause pulley arm 100 to rotate about attachment 102 such that there is an increase in the length of side drive belt 92 wrapping around idler pulleys 94 and 96.

The foregoing description has related to the use of a pulley arm assembly used for driving a side deck with a belt that conveys power from the center deck. However, the present invention is also applicable to provide tension in a drive belt that conveys power between two other systems which articulate relative one another, for example between the engine and a cutting deck. The drive belt in this application also requires that tension be maintained to accomodate wear and slippage. Further, as the cutting deck articulates relative to the prime mover, tension must be maintained during that articulation.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. In an apparatus for mowing which includes a first cutting blade mounted on a first rotatable shaft and a second cutting blade mounted on a second rotatable shaft, the first shaft being rotatably mounted to a first deck, the second shaft being rotatably mounted to a second deck, the first deck being pivotably coupled to the second deck, and means for driving the cutting blades, the means for driving one of the cutting blades including a drive belt extending from the first shaft to the second shaft, the improvement which comprises:

a pulley arm mounted to the mowing apparatus and rotatable about a rotation axis;

a first idler pulley rotatably attached to said pulley arm;

a second idler pulley rotatably attached to the mowing apparatus, the drive belt engaging said first idler pulley and said second idler pulley; and means for biasing said pulley arm in a direction of rotation to increase the tension in or travel distance of the drive belt;

wherein said second idler pulley is rotatably attached to said pulley arm.

2. The improvement of claim 1 wherein said first and second idler pulleys are located on opposite sides of the rotation axis of said pulley arm.

3. The improvement of claim 2, wherein said pulley arm is mounted to said first deck and said biasing means is mounted to said second deck.

4. The improvement of claim 1 wherein said biasing means is a spring.

5. The improvement of claim 1 in which the rotation axis of said pulley arm is parallel to the axes of rotation of the first and second shafts.

6. In an apparatus for mowing which includes a first cutting blade mounted on a first rotatable shaft and a second cutting blade mounted on a second rotatable shaft, and means for driving the cutting blades, the means for driving one of the cutting blades including a drive belt extending from the first shaft to the second shaft, the improvement which comprises:

a pulley arm mounted to the mowing apparatus and rotatable about a rotation axis;

a first idler pulley rotatably attached to said pulley arm;

a second idler pulley rotatably attached to the mowing apparatus, the drive belt engaging said first idler pulley and said second idler pulley; and means for biasing said pulley arm in a direction of rotation to increase the tension in or travel distance of the drive belt;

wherein the first shaft and first cutting blade are mounted to a first deck and the second shaft and second cutting blade are mounted to a second deck, said first deck being hingedly connected to said second deck, said pulley arm is mounted to said first deck, and said biasing means is mounted to said second deck.

7. The improvement of claim 6, wherein said second idler pulley is rotatably attached to said pulley arm.

8. The improvement of claim 7, wherein said first idler pulley and said second idler pulley are located on opposite sides of the rotation axis of said pulley arm.

9. The improvement of claim 8, wherein said biasing means is a spring.

10. In an apparatus for mowing of the type which includes an engine attached to an engine support structure, the engine powering a driving pulley, the driving pulley powering a drive belt, and a rotatable cutting blade attached to a driven pulley with the driven pulley being driven by the drive belt, the drive belt being loaded in tension, the cutting blade being rotatably mounted to structure pivotable relative to the engine, the improvement which comprises:

a pulley arm mounted to the mowing apparatus and rotatable about a rotation axis;

a first idler pulley rotatably attached to said pulley arm;

a second idler pulley, the drive belt engaging said first idler pulley and said second idler pulley wherein said second idler pulley is rotatably attached to said pulley arm; and means for biasing said pulley arm in a direction of rotation that increases the tension in or travel distance of the drive belt.

11. The improvement of claim 10 wherein said first idler pulley and second idler pulley are located on opposite sides of the rotation axis of said pulley arm.

12. The improvement of claim 10 wherein said biasing means is a spring.

13. In an apparatus for mowing which includes a first cutting blade mounted on a first shaft rotatable about a first axis and a second cutting blade mounted on a second shaft rotatable about a second axis, the first and second cutting blades rotating in a common horizontal plane when the first and second axes of rotation are oriented vertically, and means for driving the cutting blades, the means for driving one of the cutting blades including a drive belt extending from the first shaft to the second shaft, the improvement comprising:

a mounting means for mounting the first cutting blade and the second cutting blade to provide pivoting of the first cutting blade and the second cutting blade about an axis extending within the common horizontal plane;

a pulley arm mounted to the mowing apparatus and rotatable about a rotation axis;

a first idler pulley rotatably attached to said pulley arm;

a second idler pulley rotatably attached to the mowing apparatus, the drive belt engaging said first idler pulley and said second idler pulley wherein said second idler pulley is rotatably attached to said pulley arm; and means for biasing said pulley arm in a direction of rotation to increase the tension in or travel distance of the drive belt.

14. The improvement of claim 13 wherein said first and second idler pulleys are located on opposite sides of the rotation axis of said pulley arm.

15. The improvement of claim 13 wherein biasing means is a spring.

16. The improvement of claim 13 in which the rotation axis of said pulley arm is parallel to the axes of rotation of the first and second shafts.

17. The improvement of claim 16, wherein the first shaft is rotatably mounted to a first deck and the second shaft is rotatably mounted to a second deck, and said pulley arm is mounted to said first deck and said biasing means is mounted to said second deck.

18. In an apparatus for mowing which includes a first cutting blade mounted on a first shaft rotatable about a first axis and a second cutting blade mounted on a second shaft rotatable about a second axis, the first and second cutting blades rotating in a common horizontal plane when the first and second axes of rotation are oriented vertically, means for driving the cutting blades, the means for driving one of the cutting blades including a drive belt extending from the first shaft to the second shaft, the improvement comprising:

a mounting means for mounting the first cutting blade to the second cutting blade to provide pivoting of the first cutting blade and the second cutting blade about an axis extending within the common horizontal plane;

a pulley arm mounted to the mowing apparatus and rotatable about a rotation axis;

a first idler pulley rotatably attached to said pulley arm;

a second idler pulley rotatably attached to the mowing apparatus, the drive belt engaging said first idler pulley and said second idler pulley; and means for biasing said pulley arm in a direction of rotation to increase the tension in or travel distance of the drive belt;

wherein the first shaft and cutting blade are mounted to a first deck and the second shaft and cutting blade are mounted to a second deck, the first deck being hingedly connected to the second deck, the pulley arm is mounted to the first deck, and the biasing means is mounted to the second deck.

19. The improvement of claim 18, wherein said second idler pulley is rotatably attached to said pulley arm.

20. The improvement of claim 19, wherein said first idler pulley and said second idler pulley are located on opposite sides of the rotation axis of said pulley arm.

21. The improvement of claim 20, wherein said biasing needs is a spring.

22. An apparatus for mowing which comprises:

a first cutting blade mounted on a first rotatable shaft, said first shaft being rotatably mounted to a first deck;

a second cutting blade mounted on a second rotatable shaft, said second shaft being rotatably mounted to a second deck, said second deck being pivotable relative to said first deck;

a drive belt extending from said first shaft to said second shaft for driving said second cutting blade;

a pulley arm mounted to said first deck or said second deck and rotatable about a rotation axis;

a first idler pulley rotatably attached to said pulley arm;

a second idler pulley rotatably attached to said pulley arm, said drive belt engaging said first idler pulley and said second idler pulley in a travel distance around at least a portion of said first idler pulley and at least a portion of said second idler pulley; and means for biasing said pulley arm in a direction of rotation to increase the tension in said drive belt or increase the travel distance of said drive belt.

23. The apparatus of claim 22, wherein said biasing means is mounted to said first deck and said pulley arm is mounted to said second deck.

24. The apparatus of claim 22 wherein said drive belt engages said first idler pulley and said second idler pulley in an "S" shape.

25. The apparatus of claim 22, wherein said first idler pulley and said second idler pulley are located on opposite sides of the rotation axis of said pulley arm.

26. The apparatus of claim 25 wherein said drive belt engages said first idler pulley and said second idler pulley in an "S" shape.

27. The apparatus of claim 26, wherein said biasing means is mounted to said first deck and said pulley arm is mounted to said second deck.

28. The apparatus of claim 27, wherein said biasing means is a spring.

29. The apparatus of claim 28 wherein said first cutting blade defines a first cutting plane, said second cutting blade defines a second cutting plane, said second deck is pivotable relative to said first deck about a pivot axis, and the pivot axis extends within the first cutting plane and the second cutting plane.

30. The apparatus of claim 29 which further comprises:

a third cutting blade mounted on a third rotatable shaft, said third shaft being rotatably mounted to a third deck, said third deck being pivotable relative to said first deck;

a second drive belt extending from said first shaft to said third shaft for driving said third cutting blade;

a second pulley arm mounted to said third deck or said first deck and rotatable about a rotation axis;

a third idler pulley rotatably attached to said second pulley arm;

a fourth idler pulley rotatably attached to said second pulley arm, said second drive belt engaging said third idler pulley and said fourth idler pulley in a travel distance around at least a portion of said third idler pulley and at least a portion of said fourth idler pulley in an "S" shape; and a second spring for biasing said second pulley arm in a direction of rotation to increase the tension in said second drive belt or increase the travel distance of said second drive belt.

31. The apparatus of claim 22 wherein said first cutting blade defines a first cutting plane, said second cutting blade defines a second cutting plane, said second deck is pivotable relative to said first deck about a pivot axis, and the pivot axis extends within the first cutting plane and the second cutting plane.

32. An apparatus for mowing which comprises:

a first cutting blade mounted on a first rotatable shaft, said first shaft being rotatably mounted to a first deck;

a second cutting blade mounted on a second rotatable shaft, said second shaft being rotatably mounted to a second deck, said second deck being pivotable relative to said first deck;

a drive belt extending from said first shaft to said second shaft for driving said second cutting blade;

a pulley arm mounted to said second deck and rotatable about a rotation axis;

a first idler pulley rotatably attached to said pulley arm;

a second idler pulley, said drive belt engaging said first idler pulley and said second idler pulley in a travel distance around at least a portion of said first idler pulley and at least a portion of said second idler pulley means for biasing said pulley arm in a direction of rotation to increase the tension in said drive belt or increase the travel distance of said drive belt, said biasing means being mounted to said first deck.

33. The apparatus of claim 32 wherein said drive belt engages said first idler pulley and said second idler pulley in an "S" shape.

34. The apparatus of claim 32 wherein said second idler pulley is rotatably attached to said pulley arm.

35. The apparatus of claim 32 wherein said first idler pulley and said second idler pulley are located on opposite sides of the rotation axis of said pulley arm.

36. The apparatus of claim 35 wherein said drive belt engages said first idler pulley and said second idler pulley in an "S" shape.

37. The apparatus of claim 36 wherein said biasing means is a spring.

38. The apparatus of claim 37 wherein said first cutting blade defines a first cutting plane, said second cutting blade defines a second cutting plane, said second deck is pivotable relative to said first deck about a pivot axis, and the pivot axis extends within the first cutting plane and the second cutting plane.

39. The apparatus of claim 38 which further comprises:

a third cutting blade mounted on a third rotatable shaft, said third shaft being rotatably mounted to a third deck, said third deck being pivotable relative to said first deck;

a second drive belt extending from said first shaft to said third shaft for driving said third cutting blade;

a second pulley arm mounted to said third deck or said first deck and rotatable about a rotation axis;

a third idler pulley rotatably attached to said second pulley arm;

a fourth idler pulley rotatably attached to said second pulley arm, said second drive belt engaging said third idler pulley and said fourth idler pulley in a travel distance around at least a portion of said third idler pulley and at least a portion of said fourth idler pulley in an "S" shape; and a second spring for biasing said second pulley arm in a direction of rotation to increase the tension in said second drive belt or increase the travel distance of said second drive belt.

40. The apparatus of claim 32 wherein said first cutting blade defines a first cutting plane, said second cutting blade defines a second cutting plane, said second deck is pivotable relative to said first deck about a pivot axis, and the pivot axis extends within the first cutting plane and the second cutting plane.

* * * * *

UNITED STATES PATENT AND TRADEMARK OFFICE
CERTIFICATE OF CORRECTION

PATENT NO. : 6,065,274
DATED : May 23, 2000
INVENTOR(S) : Jeffrey J. Laskowski et al.

It is certified that error appears in the above-identified patent and that said Letters Patent is hereby corrected as shown below:

<u>Column 9,</u>
Line 31, please insert -- said -- following "wherein" and before "biasing".

<u>Column 10,</u>
Line 9, please change "needs" to -- means --.

Signed and Sealed this

Thirtieth Day of September, 2003

JAMES E. ROGAN
*Director of the United States Patent and Trademark Office*